Feb. 26, 1924.
H. G. JOHNSTON
HYDRAULIC SWIVEL
Filed June 1, 1921
1,484,786
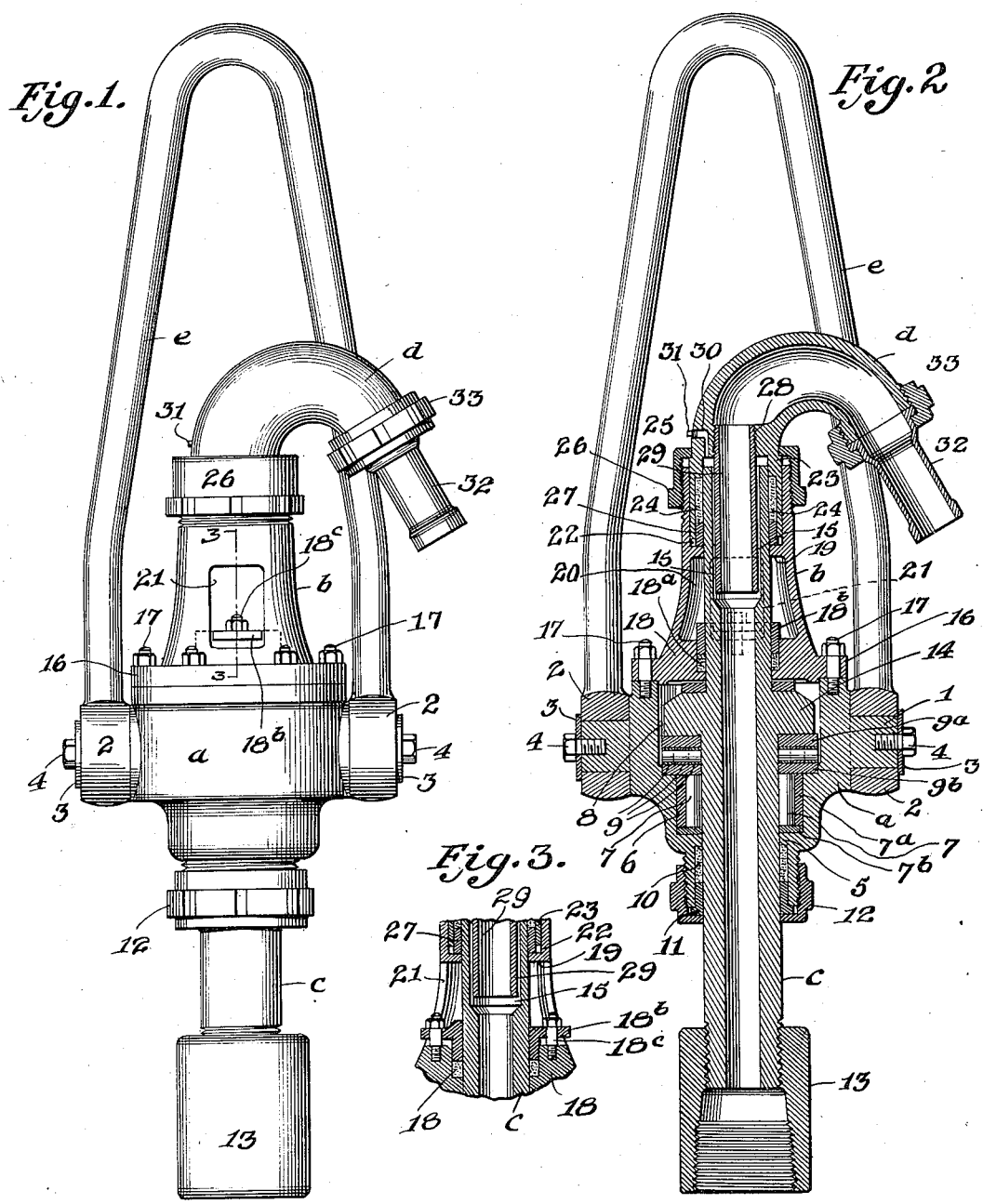
Horace G. Johnston
INVENTOR.
BY
Mason Fenwick & Lawrence
ATTORNEYS Patented Feb. 26, 1924.

1,484,786

UNITED STATES PATENT OFFICE.

HORACE GREELEY JOHNSTON, OF CORSICANA, TEXAS, ASSIGNOR, BY DIRECT AND MESNE ASSIGNMENTS, OF FOUR-FIFTHS TO GENEVIEVE JOHNSTON AND ONE-FIFTH TO MRS. HOWARD E. CALDWELL, BOTH OF CORSICANA, TEXAS.

HYDRAULIC SWIVEL.

Application filed June 1, 1921. Serial No. 474,246.

*To all whom it may concern:*

Be it known that I, HORACE G. JOHNSTON, a citizen of the United States, residing at Corsicana, in the county of Navarro and State of Texas, have invented certain new and useful Improvements in Hydraulic Swivels; and I do hereby declare the following to be a full, clear, and exact description of the invention, such as will enable others skilled in the art to which it appertains to make and use the same.

This invention relates to suspending devices having swiveled pipe sections particularly designed for use with rotary well drilling apparatus, and commonly known as hydraulic swivels. It comprises improved connections between the usual goose neck and swivel stem adapted to prevent the access of water or other liquid, and the grit that may be contained therein, to the swivel bearings and stuffing boxes. It also comprises details of construction particularly set forth in the ensuing description, defined in the appended claims and illustrated in the accompanying drawings.

In the drawings, Figure 1 is a side elevation of the improved hydraulic swivel;

Figure 2 is a central vertical section;

Figure 3 is a section on the line 3—3 of Figure 1 taken at right angles to the section shown in Figure 2.

In the preferred embodiment illustrated in the drawings, $a$ represents the trunnion block; $b$ a housing thereon; $c$ the swivel stem passed centrally through the trunnion block and into the housing; $d$ the goose neck, and $e$ the usual bail or clevis for sustaining the trunnion block.

The trunnion block comprises a body having diametrically opposite trunnions 1 on which are pivoted the perforated ends 2 of the bail $e$. The ends 2 of the bail are held in place on the trunnions by any suitable means such as disks 3 secured by bolts 4, the margins of the disks overhanging the ends of the trunnions and confining the bail ends 2 on said trunnions.

Trunnion block $a$ is provided with an axial bore of different diameters at different portions of its length through which the swivel stem $c$ is passed, the smallest portion of the bore, at 5, engaging the outside of the swivel stem. Above the smallest portion 5 is a counter bored chamber 6 adapted to receive bearing rollers 7 and suitable wear or bearing plates $7^a$ and $7^b$. Above the counter bored chamber 6 is a larger counter bored chamber 8 for receiving the thrust bearing rollers 9 together with the upper and under wear plates $9^a$ and $9^b$ which contact with them. The lower end of the trunnion block below the reduced bore 5 is counterbored from beneath in order to receive packing material 10, adapted to be compressed in the counter bore by a gland 11 which may be tightened upon the packing by the cap 12 threaded to the exterior of the lower reduced end of the trunnion block.

The lower end of the swivel stem $c$ is provided with a nipple 13 having preferably right and left hand threads for connecting the swivel stem with the upper end of the piping with which the hydraulic swivel is to be used. A heavy shoulder 14, formed integrally with the swivel, rests upon the thrust bearing within the counter bore 8 and sustains the swivel stem rotatably. Above the shoulder 14 the swivel stem is slightly reduced in external diameter but the bore therein is of greater diameter for a short distance from its upper extremity, as shown at 15, than throughout the remainder of its length. Incasing the swivel stem above the trunnion block $a$ is the housing $b$ having a flanged lower end 16 securely bolted to the upper annular face of the trunnion block by screw studs 17. A centrally bored base web 18, and an annular internal flange 19, guide the swivel stem in the housing. A stuffing box comprising a counterbore or annular seat $18^a$ in the base web of the housing is filled with packing, which may be confined by an adjustable gland $18^b$ surrounding the swivel stem and secured by studs $18^c$. The gland $18^b$ is therefore in a chamber 20 in the housing formed between the side wall of the housing, the base web 18 and the internal flange 19. Opposite windows 21 render the studs $18^c$ accessible, and allow assemblage and removal of the gland.

From the stop flange 19 to the open top of the housing is an enlarged cylindrical bore within which the upper end of the swivel stem terminates. Into the annular space between the inner wall 22 of the housing $b$ above the flange 19 and between said wall and the exterior of the swivel stem, an annular counterbored bearing portion 23 of the goose neck *d* is seated, the exterior of said annular bearing portion operating in close contact with the inner wall 22 of said chamber. The interior of said bearing portion 23 is counterbored so as to provide a cavity for the reception of packing material 24 confined between the exterior of the swivel stem and the inner wall of said counter bore. Beneath the packing 24 there may be a ring 27 over which the bearing portion 23 may slide. The exterior of the bearing portion of said goose neck is provided with a shoulder 25 with which the flange of screw cap 26, threaded over the upper end of the housing *b* engages in order to confine and adjust the bearing portion, thereby compacting the packing material 24 and making a fluid tight joint.

The bore of the goose neck is reduced at the upper end of the bearing portion and is internally threaded as at 28. A length of pipe 29, threaded into the threaded portion 28 of the goose neck, extends downward concentrically into the enlarged bore at the upper end of the swivel stem. By this concentric pipe is formed a fluid tight annular chamber, closed at one end by a stuffing box, whereby liquid under pressure, confined in the pipe, may pass into said chamber between the exterior wall of pipe section 29 and the interior wall of the swivel stem, compressing air trapped therein, and the trapped compressed air prevents the liquid from reaching the stuffing box and interfering with its operation. An angular oil passage 30 leading from the exterior of the goose neck to the interior space within the goose neck above the upper end of the swivel stem, and which may be closed by a screw plug 31, provides for the injection of heavy lubricant for the purpose of keeping the stuffing box properly lubricated.

A nozzle 32 may be united with the outer end of goose neck *b* by a screw thimble 33 in the usual manner.

By means of the construction described, water and other liquid will be kept from the stuffing boxes so that said stuffing boxes may be always kept properly supplied with oil free from grit and provide for easy movement of the swiveled parts.

What I claim and desire to secure by Letters Patent is:

1. In mechanism of the class described, a trunnion block, a housing thereon having an internal flange below its top, a swivel stem extending through the trunnion block into the housing beyond said flange, a goose neck having a counterbored annular bearing portion fitted in the upper end of the housing and surrounding the swivel stem, packing material adapted to be seated in the annular chamber formed by the counter bore about the swivel stem, and a pipe secured to the goose neck and extending therefrom within the bore of the swivel stem.

2. In mechanism of the class described, a swivel stem having an enlarged bore at one end, a goose neck rotatably mounted over said swivel stem, a stuffing box in the swivel connections between the goose neck and said swivel stem, and a pipe secured fluid tight in the goose neck and extending into the enlarged bore concentric therewith.

3. In mechanism of the class described, a trunnion block, a housing thereon having an internal flange below its top, a swivel stem extending through the trunnion block and into the housing beyond the flange, a goose neck having a counterbored annular bearing portion fitted in the upper end of the housing and surrounding the swivel stem for receiving packing material, an internal shoulder within the goose neck above the end of the swivel stem, a pipe projecting from said internal shoulder into the swivel stem, and a plugged lubricating passage leading from the exterior of the goose neck through the said internal shoulder.

4. In mechanism of the class described, a housing having a tubular end, a tubular goose neck having one end fitting in the tubular end of the housing, a swivel stem fitting within the end of the goose neck, a stuffing box for closing the joint between the swivel stem and goose neck, and a pipe section extending from the goose neck into the swivel stem so as to form an air trap.

In testimony whereof I affix my signature.

HORACE GREELEY JOHNSTON.